Aug. 19, 1941.  T. A. WETZEL  2,253,357
TRANSMISSION MECHANISM
Filed April 24, 1939   2 Sheets-Sheet 1
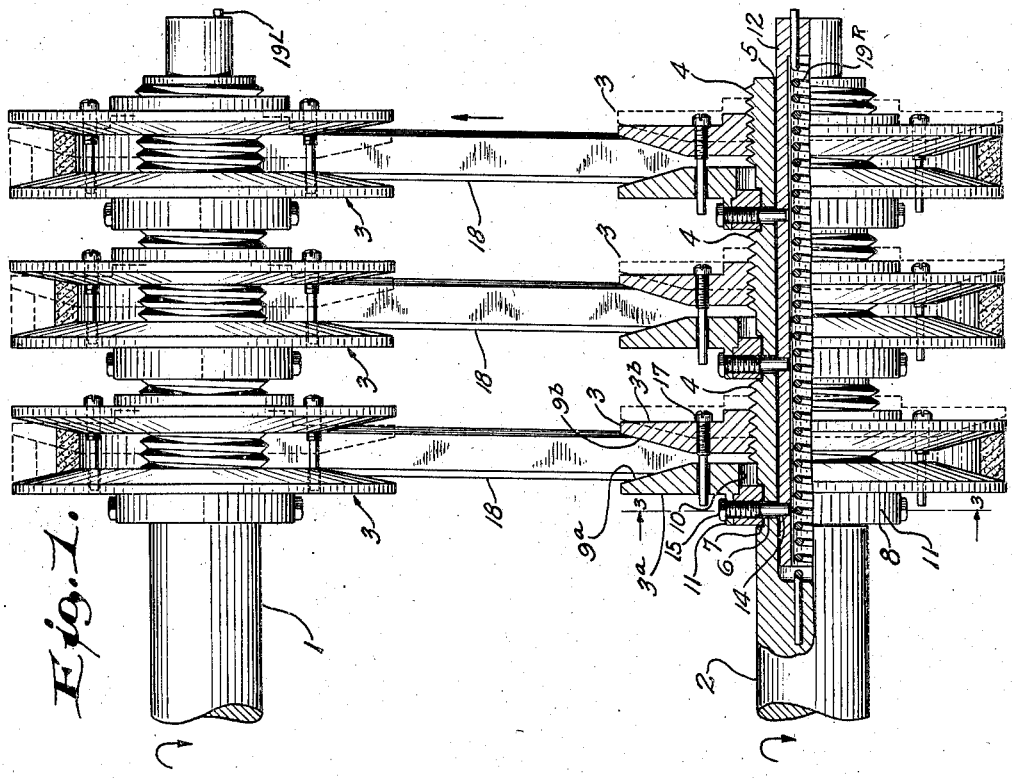
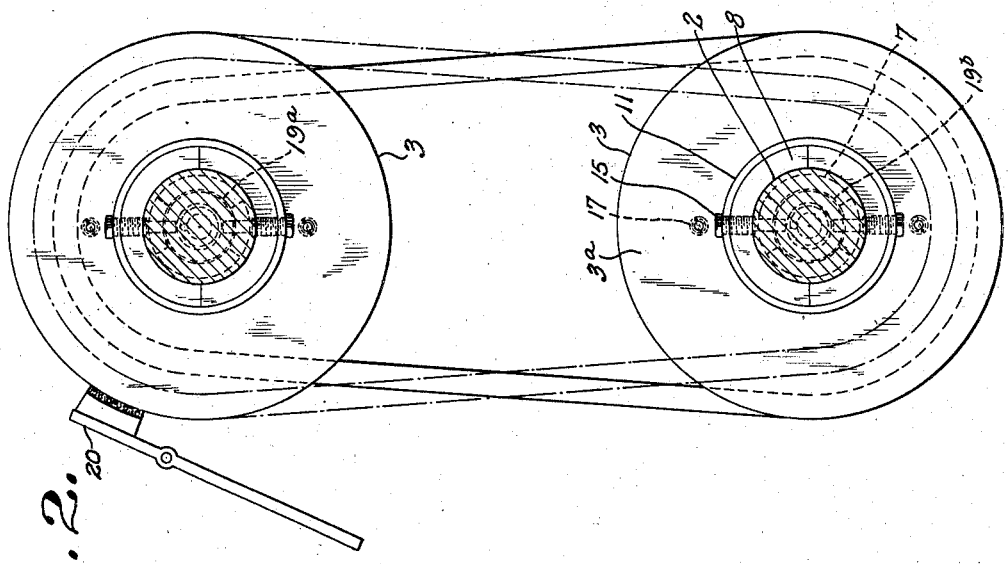
INVENTOR
Theodore A. Wetzel
BY
John W. Michael
ATTORNEY Aug. 19, 1941.   T. A. WETZEL   2,253,357
TRANSMISSION MECHANISM
Filed April 24, 1939   2 Sheets-Sheet 2

INVENTOR
Theodore A. Wetzel
BY
John W. Michael
ATTORNEY

Patented Aug. 19, 1941

2,253,357

UNITED STATES PATENT OFFICE 2,253,357

TRANSMISSION MECHANISM

Theodore A. Wetzel, Milwaukee, Wis.

Application April 24, 1939, Serial No. 269,627

2 Claims. (Cl. 74—230.17)

This invention relates to improvements in transmission mechanisms of the type employing belt and pulley or other frictional gearing drive.

One of the objects of the present invention is to provide a transmission in which the ratio between the driver and driven elements thereof is automatically adjusted. This is accomplished by providing on driver and/or driven shafts pulleys automatically adjustable to alter their pitch diameter in response to varying conditions of speed and/or torque and frictionally gearing such pulleys by an endless belt.

Another object of the present invention is to provide a pulley comprised of two sections axially adjustable to vary the pitch diameter of the pulley.

Other objects and advantages reside in certain novel features of construction, arrangement, and combination of parts, which will be hereinafter more fully described and particularly pointed out in the appended claims, reference being had to the accompanying drawings forming a part of this specification, and in which:

Figure 1 is a view in front elevation of a transmission mechanism embodying the invention and having pulleys in parallel multiple hookup, parts being shown in section for the sake of clarity;

Figure 2 is an end view of the mechanism shown in Figure 1;

Figure 3:
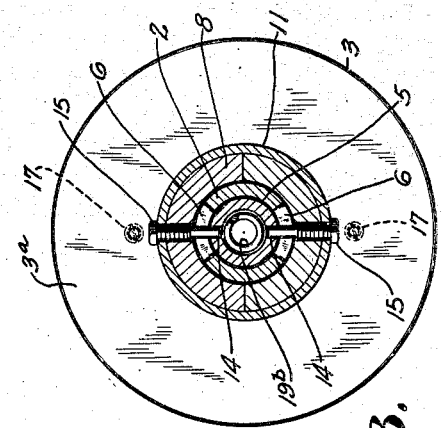
Figure 3 is a view taken on the section line 3—3 of Figure 1.

Broadly, the mechanism comprises V cross-section belts and pulleys. Each pulley is divided into two sections each with a cone-shaped, belt-engaging surface. Each section, as positioned on the common shaft, has limited axial movement relative to the other. Increase or decrease of the spacing between these sections causes the belt to ride lower or higher in the V notch formed by the cone-shaped surfaces. In other words, the pitch diameter is altered. By the use of wedge or screw means acting between the shaft and a section or sections of the pulley, this increase or decrease of spacing is accomplished. Any reactable energy storing member or spring of predetermined strength, reacting on the wedge or screw means, provides the means of automatically regulating the axial movement or change in pitch diameter in response to changes in speed and/or torque conditions.

Various combinations or arrangements of these adjustable pitch diameter pulleys may be made to provide transmissions of varying characteristics in which the changes in the ratio of the driver to the driven elements thereof will respond in such manner to changes in torque and/or speed resulting from starting, increase or decrease in load or in power while running, runaway on driven element or brake applied on driver element, as will best suit the purpose desired. These arrangements will hereinafter be described in detail.

Throughout the specification the rotation of the various shafts and pulleys will be referred to as "clockwise" or "counterclockwise," as viewed from the right of the drawings.

Multiple drive

Referring now to the embodiment illustrated in Figures 1, 2, and 3, a plurality of sheaves or pulleys 3 are arranged in parallel fashion on common shafts in order that a greater load may be transferred. The sheaves or pulleys 3 are identical in construction, and the description thereof will be applied to one only. The same is true of the driver and driven shafts 1 and 2, with the exception that the energy-storing spring is coiled left-handedly in the shaft 1 and right-handedly in the driven shaft 2. With this construction it is important, when adjusting the sheaves for purposes of changing the pitch diameter, that they be adjusted in the same degree. To accomplish this, the shaft 2 is provided, as shown, with three spaced, raised, threaded portions 4. Co-extensive of the threaded portions 4 the shaft is provided with a counter-bore 5. Adjacent each threaded portion 4 opposed, arcuately extending slots 6 are provided in the wall of the shaft 2 extending between the counter-bore 5 and the lateral surface of the shaft 2. The surface of the shaft 2 in alinement with these slots 6 is provided with a circumferential groove 7 adapted to receive and rotatively retain a split collar 8. The pulley 3 is comprised of two sections, each having a cone-shaped, belt-receiving surface 9a—9b adapted, when the sections are placed in axial alinement, to provide a V-shaped belt-receiving groove. The section 3a of the pulley 3 has a central bore 10 of sufficient diameter to permit the pulleys 3 to be placed on the shaft from one end thereof and to freely pass over the raised threaded portions 4. Adjacent the bore 10 is a laterally extending flange 11 adapted to fit over and retain the split collar 8.

A hollow closed end tube 12, substantially co-extensive of the counter-bore 5, is positioned to be rotatively held therein. Within the tube 12 is positioned a coiled torsion spring 19L, one end being secured to the tube 12 and the other end to the shaft 2. In alinement with the radial slots 6 the tube 12 is provided with opposed apertures 14. The split collar 8 and the flange 11 are provided with alined threaded holes into which a retaining peg screw 15 having an extended portion is inserted. Two of these screws 15 are provided in oppositely spaced position and secure the split collar 8 to the section 3a. The fit between the split collar 8 and groove 11 is sufficient to maintain the section 3a in accurate position on the shaft 2 while permitting the same to rotate relatively thereto. The extended portion of the peg screws 15 is slidably retained in the radially extending slots 6 and fixedly engaged in the apertures 14 in the tube so that the section 3a rotates with the tube 12. This construction assures that each of the sections 3a on the same shaft will rotate with respect thereto an identical amount to assure that the change in pitch diameter will be the same for each pulley on the same shaft. It also comprises stops limiting the relative movement between shaft and pulley.

The other section 3b is provided with a centrally located bore having a left-hand thread adapted to fit with the threaded portion 4 on the shaft 2. The fit is such as to permit relative rotation therebetween while maintaining the section 3b in proper alinement with the shaft 2. Adjacent the hubs the sections 3a and 3b are provided with alined apertures spaced at 180°. Peg screws 17 are threaded into the apertures in section 3b and have extended portions slidably fitted within the alined apertures in section 3a. Thus, rotative force communicated to either of the sections will be transmitted to the other section while permitting them to have relative axial movement. The remaining construction of the pulley 3, and the construction of the driving belt 18, is well known in the art, and is generally known under the term "V-belt drive."

The coiled torsion spring 19L in the tube in the driver shaft 1 is a left-hand spiral, while the spring 19R in the tube of the driven shaft 2 is right-hand spiral. In the position shown in Figure 1, the torsion springs 19L and 19R in the shafts 1 and 2 have been wound to store energy as a result of an increase in torque due to starting or increase in load or power while running, and the pitch diameter of driver pulleys on shaft 1 has been decreased, and that of the driven pulleys on shaft 2 increased. In this position the shaft 1 has been rotated in a counterclockwise direction relative to the pulleys on said shaft an amount sufficient to cause the threads to move the sections apart, thereby permitting the belts to drop down to a smaller pitch diameter. Likewise, the pulleys 3 on the driven shaft 2 have been rotated counter clockwise relative to said shaft an amount sufficient to cause the threads 4 to move the sections 3b toward the sections 3a so that the belt rides on a larger pitch diameter. As torque or speed conditions vary the torsion springs wind or unwind to store or give up energy. As the torsion spring 19L gives up energy, the pulleys on shaft 1 rotate counter clockwise relative to that shaft. As the torsion spring 19R gives up energy, the shaft 2 is rotated counter clockwise relative to the pulleys 3 on that shaft. This causes the sections of the pulleys on shaft 1 to move together, and the sections 3b of pulleys on shaft 2 to move away from the sections 3a, thereby increasing the pitch diameter of the pulleys on shaft 1 and decreasing the pitch diameter of the pulleys on shaft 2.

The change in pitch diameter can effect an over drive relationship between the driver and driven shafts. The change in pitch diameters is effected when both driver and driven shafts are operated at high as well as low rates of speed, as such change is responsive to increment changes in speed and/or torque conditions. It is possible that at times the pitch diameters of the driver and driven pulleys will be constantly changing in minute degrees.

The transmission may be effectively used for braking purposes. In this connection the driven shaft 2 is constituted the driver and is rotated in a clockwise direction. The driver shaft 1 is constituted the driven shaft and the brake 20 is applied to it. When the brake is not applied, the driven shaft, which will then constitute the brake drum, revolves at a slow rate of speed with respect to the driving shaft. When the brake is applied, consequentially increased torque causes an decrease in pitch diameter of the pulleys on the drum shaft and an increase in pitch diameter of the pulleys on the newly constituted driver shaft. This ratio change causes the brake drum to be driven at a greater rate of speed than the driving shaft, and by reason thereof the braking will be accomplished in a smooth and effective fashion.

The braking can also be applied to the driver shaft. In such instance the shaft 2 is constituted the driver and rotated clockwise. The shaft drives the pulleys through engagement between the end of the slot 6 and the peg screws 15. The torsion spring 19R is wound left-hand spiral and continually urges the pulley counterclockwise of the shaft 2 to maintain the aforesaid driving engagement. In this position the sections 3a and 3b are together, and a large pitch diameter created. The torsion spring 19L in shaft 1, which will be constituted the driven shaft, is wound right-hand spiral. From this it will be understood that the pulley on shaft 1 is urged clockwise thereof into driving engagement with the shaft at the limit permitted and with the pitch diameter at its smallest size. When a brake is applied to the driver shaft 2, the reaction force is partly used in winding the torsion springs to cause the pitch diameter of the driver to decrease and the pitch diameter of the driven to increase, thus multiplying the braking power inherent in the driving mechanism.

*Double action*

The reactable energy-storing spring may also be made to have a double action. The torsion springs 19L, 19R, store energy as they are wound, and give up energy as they unwind. They are not suitable, however, to store energy upon being unwound more than their normal unstressed or repose position. In order to have a pulley that will decrease its pitch diameter from normal upon an increase in torque requirement acting in one direction, and increase its pitch diameter from normal upon an increase in torque requirement acting in another direction, it is essential to construct the energy storing spring in such a manner as to make it double acting.

This can be accomplished by providing in addition to the torsion spring 19R, disclosed in Figure 1, a similar torsion spring having opposing reaction. To provide for this additional spring it would merely necessitate extending the shaft 2 and tube 12 an amount sufficient to accommodate the additional spring and capping the end of the shaft as extended to form an anchor for the outer end of the spring. The inner end would be secured to the tube 12 in like manner as spring 19R. In this construction the added spring would also be right-hand spiral as when placed in end to end relationship and wound by a common member (the tube 12) attached to adjacent ends springs of the same spiral winding react against each other.

The opposing springs are so adjusted relative to each other and the shaft that under normal operating conditions the pulley is adjusted for a pitch diameter intermediate between its smallest and largest pitch diameters.

I claim:

1. A multiple sheave adjusting pulley, each sheave having relatively adjustable sections to vary the pitch diameter, a shaft for said pulley, screw means on said shaft to shift one section of each of said sheaves, a common member mounted within said shaft, means connecting said common member and the other sections of said sheaves, and spring means acting through said member to regulate the shifting.

2. A multiple sheave adjusting pulley comprising a shaft, a plurality of spaced threaded portions on said shaft, a counter bore in said shaft coextensive of said portions, a plurality of arcuately extending slots in said shaft between said bore and the lateral surface of said shaft, a tube rotatably supported in said bore, a coil spring within said tube and connected thereto and to said shaft, a plurality of sheaves each comprising two sections, said sections forming therebetween a V-shaped belt-receiving groove, one of said sections of each pulley being rotatively mounted on said shaft, means connecting each of said sections to said tube, said means operating through said slots, the other of said sections of each pulley having a threaded interconnection with one of said threaded portions, and means connecting said sections of each sheave restraining them to rotate simultaneously while permitting them to have relative axial movement.

THEODORE A. WETZEL.